(12) United States Patent
Kim et al.

(10) Patent No.: US 12,438,864 B2
(45) Date of Patent: Oct. 7, 2025

(54) TOKEN VERIFICATION METHOD AND SERVICE SERVER USING THE SAME

(71) Applicant: SAMSUNG SDS CO., LTD., Seoul (KR)

(72) Inventors: Yong Wook Kim, Seoul (KR); Jang Hyun Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 181 days.

(21) Appl. No.: 18/224,290

(22) Filed: Jul. 20, 2023

(65) Prior Publication Data

US 2024/0098079 A1 Mar. 21, 2024

(30) Foreign Application Priority Data

Sep. 15, 2022 (KR) .................. 10-2022-0116400

(51) Int. Cl.
*H04L 9/40* (2022.01)

(52) U.S. Cl.
CPC ........ *H04L 63/0807* (2013.01); *H04L 63/126* (2013.01)

(58) Field of Classification Search
CPC .. H04L 63/0807; H04L 63/126; H04L 9/3213
See application file for complete search history.

(56) References Cited

U.S. PATENT DOCUMENTS

| | | | |
|---|---|---|---|
| 8,407,770 B2 | 3/2013 | Tsai et al. | |
| 9,838,727 B1 * | 12/2017 | Chaudhry | H04N 21/25816 |
| 11,356,458 B2 | 6/2022 | Agarwal et al. | |
| 2015/0180868 A1 * | 6/2015 | Sng | H04L 63/0846 |
| | | | 726/9 |
| 2020/0136825 A1 * | 4/2020 | Gupta | G06F 9/445 |
| 2020/0296113 A1 | 9/2020 | Agarwal et al. | |
| 2021/0400047 A1 * | 12/2021 | Gu | H04L 67/568 |
| 2022/0028160 A1 * | 1/2022 | Patel | H04L 9/3228 |

FOREIGN PATENT DOCUMENTS

| | | |
|---|---|---|
| KR | 10-2019-0134135 A | 12/2019 |
| KR | 10-2184928 B1 | 12/2020 |
| KR | 10-2247132 B1 | 5/2021 |
| KR | 10-2022-0051599 A | 4/2022 |

* cited by examiner

*Primary Examiner* — Amie C. Lin
(74) *Attorney, Agent, or Firm* — Sughrue Mion, PLLC (57) ABSTRACT

Provided is a method for a token verification performed by a service server. The method according to some embodiments of the present disclosure comprises receiving a service request message comprising a token from a client, performing a first verification process for the token through local storage of the service server in response to the service request message and performing a second verification process for the token through another service server related to a used service list in response to failure of the first verification process, wherein the service request message further comprises the used service list of the client.

20 Claims, 10 Drawing Sheets

TOKEN VERIFICATION METHOD AND SERVICE SERVER USING THE SAME

This application claims priority from Korean Patent Application No. 10-2022-0116400, filed on Sep. 15, 2022, in the Korean Intellectual Property Office, the disclosure of which is incorporated herein in its entirety by reference.

BACKGROUND

1. Field

The present disclosure relates to a token verification method and a service server using the same, and more particularly, to a method of verifying a token issued to a client and a server providing a service using the method.

2. Description of the Related Art

Many existing service providing systems use tokens to restrict service requests from unauthorized clients. For example, service providing systems issue a token to a client which successfully logs in, verify the validity of the token included in the client's service request, and provide a requested service only when the token is valid.

Most service providing systems using tokens verify tokens using centralized token storage or through an authentication server. For example, some service providing systems adopt a method of storing token verification information (e.g., token, token expiration date, etc.) in centralized token storage and verifying tokens using the stored information. In addition, other service providing systems adopt a method of requesting the authentication server to verify a token and receiving the verification result.

The former method has the advantage of reducing the load on the authentication server. However, there is a serious disadvantage (the so-called single point of failure (SPOF) problem) that the operation of the entire system stops when a failure occurs in the token storage. In addition, the latter method not only has a disadvantage that an excessive load is imposed on the authentication server due to token verification, but also has a problem that the authentication server may become a SPOF. In addition, in any method, the seriousness of a problem rapidly increases as the scale of the system increases (i.e., a scalability problem exists). Therefore, it is difficult to apply these methods to a large-scale service providing system.

SUMMARY

Aspects of the present disclosure provide a token verification method robust to a single point of failure (SPOF) problem and capable of improving system stability and a server/system providing a service using the method.

Aspects of the present disclosure also provide a token verification method capable of reducing the load of an authentication server due to token verification and a server/system providing a service using the method.

Aspects of the present disclosure also provide a token verification method capable of improving token verification speed and a server/system providing a service using the method.

Aspects of the present disclosure also provide a token verification method easily applicable to a large-scale service providing system.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a method for A token verification may comprise receiving a service request message comprising a token from a client, performing a first verification process for the token through local storage of the service server in response to the service request message and performing a second verification process for the token through another service server related to a used service list in response to failure of the first verification process, wherein the service request message further comprises the used service list of the client.

In some embodiments, wherein the local storage comprises a local cache and a database, and the performing of the first verification process may comprises searching the local cache for verification information of the token and searching the database for the verification information in response to a search result indicating that the verification information does not exist in the local cache.

In some embodiments, wherein the service server may provides a service using a plurality of instances, the local cache exists in each of the instances, and the database is shared between the instances.

In some embodiments, wherein a token manager is executed in each of the instances, and the token verification method may be performed by the token manager.

In some embodiments, wherein the searching of the database for the verification information may comprises searching the database in response to the determination that a service may provided by the service server exists in the used service list.

In some embodiments, further may comprising verifying the token using the found verification information in response to a search result indicating that the verification information exists in the database and storing the found verification information in the local cache.

In some embodiments, further may comprising obtaining the verification information of the token from the another service server through the second verification process and storing the verification information in the local storage.

In some embodiments, wherein the another service server may provides the most recently used service in the used service list.

In some embodiments, wherein the another service server may comprises a first service server providing the most recently used service in the used service list and a second service server providing another service, and the performing of the second verification process may comprises verifying the token only through the first service server.

In some embodiments, further may comprising performing a third verification process for the token through an authentication server in response to failure of the second verification process, wherein the authentication server may be a server that has issued the token.

In some embodiments, further comprising obtaining the verification information of the token from the authentication server through the third verification process and storing the verification information in the local storage.

In some embodiments, further may comprising obtaining the verification information of the token from the authentication server through the third verification process; and storing the verification information in the another service server.

In some embodiments, wherein a uniform resource locator (URL) of the service server comprises an ID of a service provided by the service server, the used service list is comprised of IDs of used services, and the performing of the second verification process may comprises generating a URL for requesting the verification of the token or the verification information of the token by using the ID of used service and performing the second verification process through the another service server by using the generated URL.

According to another aspect of the present disclosure, there is provided a server for a communication interface communicating with a client, local storage and a token manager verifying a token of the client, wherein the token manager performs, an operation of receiving a service request message comprising the token from the client, an operation of performing a first verification process for the token through the local storage in response to the service request message and an operation of performing a second verification process for the token through another service server related to a used service list in response to failure of the first verification process, wherein the service request message further comprises the used service list of the client.

In some embodiments, wherein the local storage comprises a local cache and a database, and the operation of performing the first verification process may comprises an operation of searching the local cache for verification information of the token and an operation of searching the database for the verification information in response to a search result indicating that the verification information does not exist in the local cache.

In some embodiments, wherein the operation of searching the database for the verification information may comprises an operation of searching the database in response to the determination that a service provided by the service server exists in the used service list.

In some embodiments, further may comprising an operation of verifying the token using the found verification information in response to a search result indicating that the verification information exists in the database and an operation of storing the found verification information in the local cache.

In some embodiments, further comprising an operation of performing a third verification process for the token through an authentication server in response to failure of the second verification process, wherein the authentication server is a server that has issued the token.

In some embodiments, further may comprising an operation of obtaining the verification information of the token from the authentication server through the third verification process and storing the verification information in the local storage.

According to still another aspect of the present disclosure, there is provided a program for an operation of receiving a service request message comprising a token from a client, an operation of performing a first verification process for the token through local storage of the service server in response to the service request message and an operation of performing a second verification process for the token through another service server related to a used service list in response to failure of the first verification process, wherein the service request message further comprises the used service list of the client.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
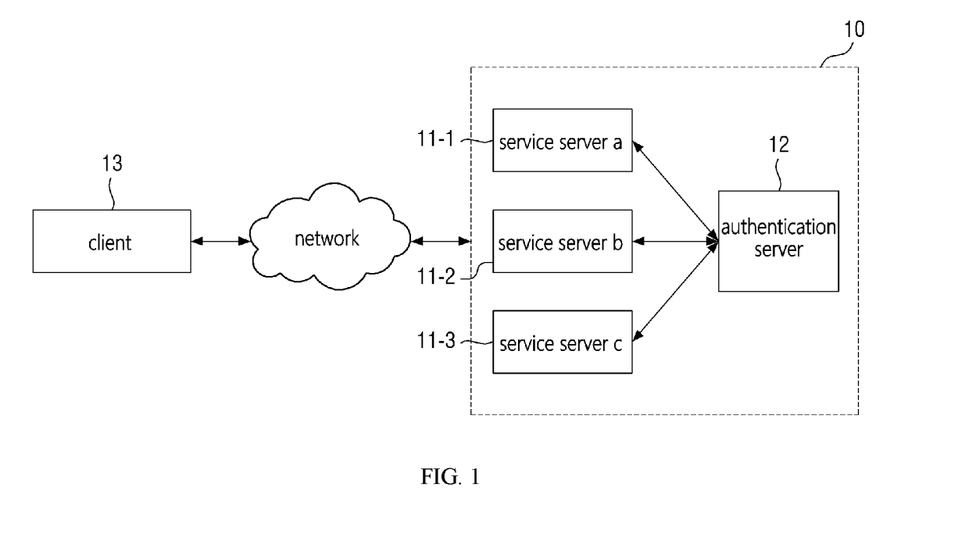
FIG. 1 is an example diagram illustrating a service providing system according to embodiments of the present disclosure.

FIG. 1 is an example diagram illustrating a service providing system 10 according to embodiments of the present disclosure.

As illustrated in FIG. 1, the service providing system 10 according to the embodiments is a system that provides a predetermined service to a client 13. The service providing system 10 may be configured to include a plurality of service servers 11-1 through 11-3 and an authentication server 12.

The service servers 11-1 through 11-3 may be computing devices/systems that provide a service in response to a request (i.e., a service request) from the client 13. The service may be, for example, a web service. However, the scope of the present disclosure is not limited thereto, and any type of service can be provided. Although a service is provided using three service servers 11-1 through 11-3 in FIG. 1, the number of service servers can vary. For ease of description, reference numeral '11' will hereinafter be used to refer to an arbitrary service server 11-1 or 11-2 or 11-3 or to collectively refer to all of the service servers 11-1 through 11-3.

A service server 11 may verify a token of the client 13 and provide (process) a requested service based on the verification result. Specifically, the service server 11 may receive a service request message including a token from the client 13 and provide the requested service only when the received token is verified to be valid. Here, the token may be issued as the client 13 logs in through the authentication server 12, but the scope of the present disclosure is not limited thereto.

Figure 2:
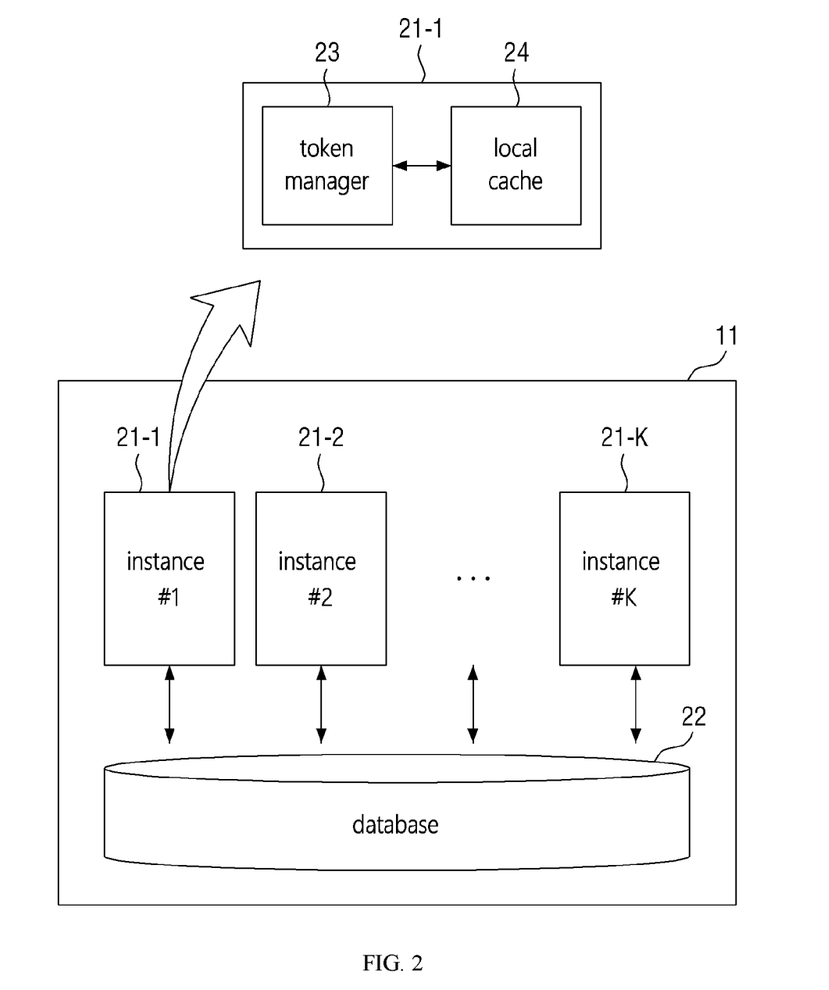
FIG. 2 illustrates an example configuration of a service server according to embodiments of the present disclosure.

The structure of the service server 11 according to embodiments is illustrated in FIG. 2.

As illustrated in FIG. 2, the service server 11 may be configured to include a plurality of instances 21-1 through 21-K and a database 22. For ease of description, reference numeral '21' will hereinafter be used to refer to an arbitrary instance 21-1 or 21-2 or . . . or 21-K or to collectively refer to all of the instances 21-1 through 21-K.

An instance 21 may refer to a service providing module (i.e., a service instance) that is independently executed (driven) within the service server 11. Each instance 21 may be implemented as a virtual server (i.e., a logical computing device) or a physical server (i.e., a physical computing device). For example, when the service server 11 is implemented as at least one computing device, a plurality of virtual servers (i.e., instances) may be executed (driven) within the service server 11 by using resources (e.g., processing resources and memory resources) of the computing device, and the service server 11 may provide (process) a service requested by the client 13 using the virtual servers. In some cases, the term 'instance' 21 may be used interchangeably with terms such as 'service instance', 'service module', and 'instance server'.

As illustrated, each instance 21 may be configured to include a token manager 23 and a local cache 24. Although not illustrated in FIG. 2, each instance 21 may further include a service handler (not illustrated) that provides (processes) a requested service.

The token manager 23 may be a module that verifies a token of the client 13 and manages token verification information. Here, the token verification information is information used to verify the validity of the token issued to the client 13. The token verification information may include, for example, information such as token, expiration date, and authority. However, the scope of the present disclosure is not limited thereto. A detailed operation of the token manager 23 will be described in detail later with reference to FIG. 3 and subsequent drawings.

Next, the local cache 24 may be a storage space (e.g., memory, storage, etc.) provided in the instance 21. The token verification information may be stored in the local cache 24. The local cache 24 may be used to verify the token of the client 13 at high speed. This will be described in detail with reference to FIG. 3 and subsequent drawings.

Next, the database 22 may be a storage space shared between a plurality of instances 21 and may be a local storage space (e.g., memory, storage, etc.) provided in the service server 11. The token verification information may also be stored in the database 22. The database 22 may also be used to verify a token at high speed. This will be described in detail with reference to FIG. 3 and subsequent drawings.

The service server 11 may be implemented in at least one computing device. For example, all functions of the service server 11 may be implemented in one computing device, or a first function of the service server 11 may be implemented in a first computing device, and a second function may be implemented in a second computing device. Alternatively, a certain function of the service server 11 may be implemented in a plurality of computing devices.

Figure 10:
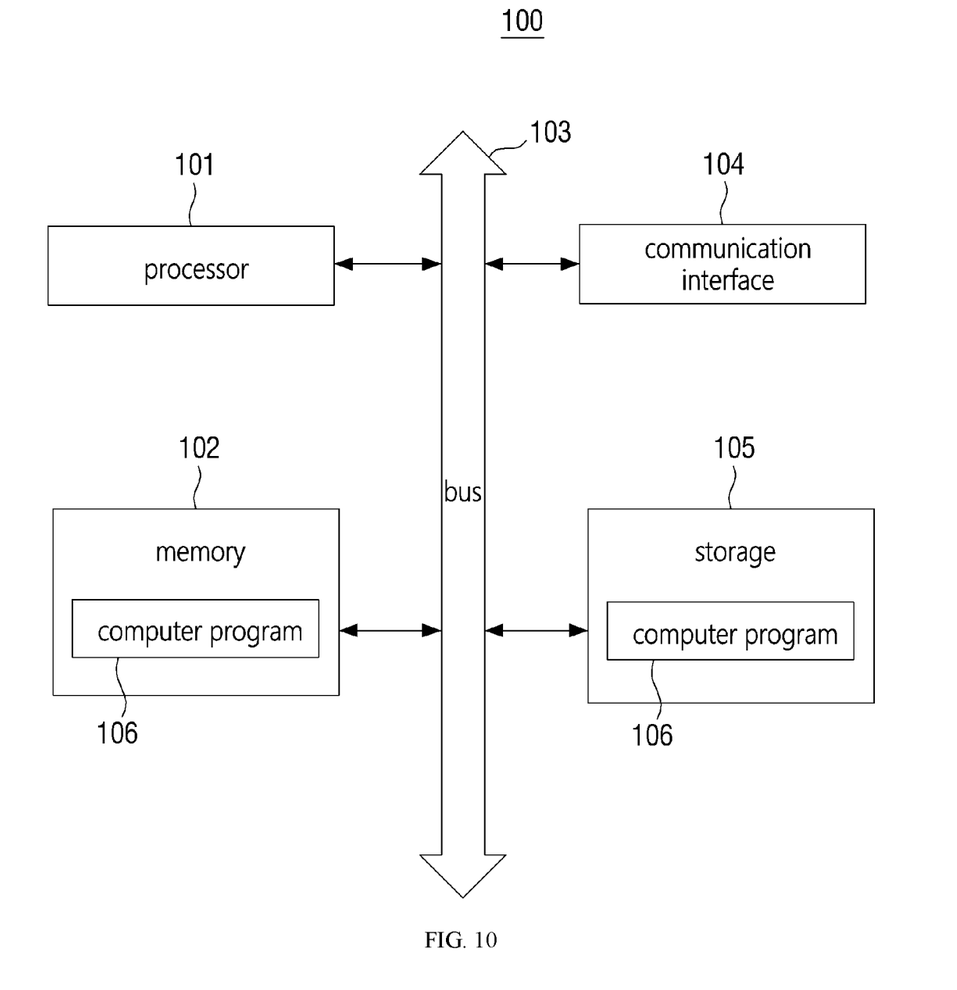
FIG. 10 illustrates an example computing device that can implement a service server, etc. according to embodiments of the present disclosure.

A computing device may be any device having a computing function, and an example of this device is illustrated in FIG. 10. Since the computing device is a collection of various components (e.g., a memory, a processor, etc.) interacting with each other, it may be named a 'computing system' in some cases. In addition, the computing system may refer to a collection of a plurality of computing devices interacting with each other.

Referring back to FIG. 1, the authentication server 12 may be a computing device/system that provides an authentication service for the client 13 or a user. Specifically, the authentication server 12 may perform login authentication based on authentication information such as an ID and a password and may issue a token to the client 13 when the login authentication is successfully performed. In addition, the authentication server 12 may extend (update) the expiration date (i.e., the validity period) of the token or may discard the issued token according to logout of the client 13.

In some embodiments, the authentication server 12 may send a notification message indicating logout of the client 13 to the service servers 11. Here, the service servers 11 which are to receive the notification message may be, for example, servers that provide services included in a list (e.g., 32 in FIG. 3) of services used by the client 13, but the scope of the present disclosure is limited thereto. In the current embodiments, the notification message may include the discarded token, and the service servers 11 receiving the notification message may delete verification information of the discarded token from local storage (e.g., 22 and 24 in FIG. 2).

Next, the client 13 may be a computing device that uses a service provided by the service providing system 10 or may be a user of the device. The client 13 may be implemented as various types of computing devices such as mobile terminals (e.g., smartphones, tablets, notebook computers, etc.) and fixed terminals (e.g., desktop computers). The client 13 can be implemented as any device.

The client 13 may log in through the authentication server 12 to receive a token and may use the services of the service servers 11 by using the token. The client 13 may send a service request message including the token to a service server 11 and receive a service. This will be described in detail with reference to FIG. 3 and subsequent drawings.

In some embodiments, the client 13 may request a service by calling an application programming interface (API) corresponding to the service (e.g., using a URL of the API), and a service server 11 may provide the service by executing the requested API and providing the execution result. However, the scope of the present disclosure is not limited thereto.

As illustrated, the client 13 and the service providing system 10 may communicate through a network. Here, the network may be implemented as all types of wired/wireless networks such as a local area network (LAN), a wide area network (WAN), a mobile radio communication network, and wireless broadband Internet (Wibro).

Until now, the service providing system 10 and its components according to the embodiments of the present disclosure have been described with reference to FIGS. 1 and 2. Hereinafter, a token verification method that can be performed by the above-described service providing system 10 will be described in detail with reference to FIG. 3 and subsequent drawings.

Figure 3:
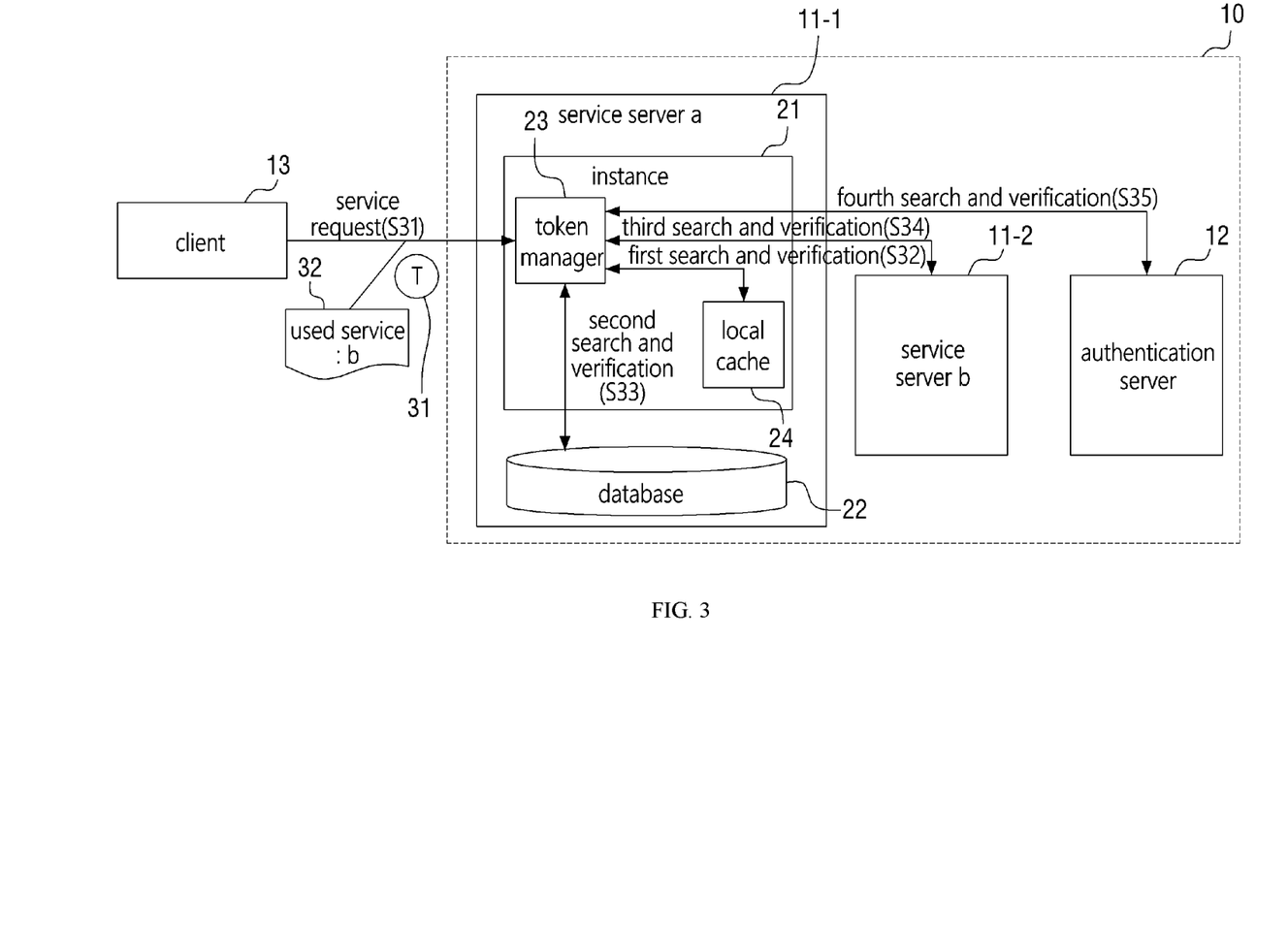
FIG. 3 is an example flowchart schematically illustrating a token verification method according to embodiments of the present disclosure.

FIG. 3 is an example flowchart schematically illustrating a token verification method according to embodiments of the present disclosure. However, this is only an exemplary embodiment for achieving the objectives of the present disclosure, and some operations can be added or deleted as needed.

As illustrated in FIG. 3, the token verification method according to the embodiments may start with operation S31 in which a certain service server 11-1 receives a service request message from the client 13. At this time, the service request message may include a token 31 and a used service list 32. In addition, when a service is requested by calling an API, the service request message may include API call information (e.g., information such as a URL of the API and parameters).

The token 31 may be issued by the authentication server 12 as the client 13 successfully logs in. However, the scope of the present disclosure is not limited thereto.

The used service list 32 refers to a list of services previously used by the client 13. The used service list 32 may include IDs of the previously used services. A method of configuring and updating the used service list 32 will be described in detail later with reference to FIG. 9.

In some embodiments, the token 31 may be a key token. That is, the token 31 may be a token including a key used to retrieve verification information, and sensitive information of the client 13 (e.g., authentication information such as ID and password) may not be included in the token 31. Accordingly, the security of the service providing system can be improved. For reference, in the art to which the present disclosure pertains, the key token may also be referred to as a 'reference token'. The description will be continued below based on the assumption that the token 31 is a key token. Therefore, searching a storage space using the token 31 may be understood as searching the storage space using the key included in the token 31.

In operation S32, a first search and verification process for the token 31 (hereinafter, referred to as a 'first verification process') may be performed. For example, the token manager 23 may search the local cache 24 for verification information of the token 31 and verify the validity of the token 31 based on the search result. This operation will be described in more detail later with reference to FIG. 4.

In some embodiments, token verification information may refer to a value token corresponding to a key token. That is, a token issued to the client 13 may be a key token (or a reference token) that does not include sensitive information, and a token stored in the service providing system 10 may be a value token corresponding to the key token. The value token may include sensitive information such as authentication information in addition to an expiration date and may be used to verify the key token 31 of the client 13.

In operation S33, a second search and verification process (hereinafter, referred to as a 'second verification process') may be performed. The second verification process is a process of retrieving and verifying token verification information through the database 22. The second verification process may be performed when verification of the token 31 through the first verification process fails. However, in some cases, for more thorough verification, the second verification process may be performed even when the validity of the token 31 is verified through the first verification process.

Here, the case where the verification of the token 31 fails may be, for example, a case where the verification information of the token 31 does not exist in the local cache 24, a case where a failure occurs in local storage (e.g., the local cache 24), or a case where an expiration date in the found verification information has passed. However, the scope of the present disclosure is not limited thereto.

For reference, when the expiration date of the token 31 has passed, the token manager 23 may reject a service request from the client 13 without performing any further verification process.

Operation S33 will be described in detail later with reference to FIG. 5.

In operation S34, a third search and verification process (hereinafter, referred to as a 'third verification process') may be performed. The third verification process is a process of retrieving and verifying token verification information through another service server 11-2 (or a process of requesting another service server 11-2 to verify the token 31). The third verification process may be performed when verification of the token 31 through the second verification process fails. However, in some cases, for more thorough verification, the third verification process may be performed even when the validity of the token 31 is verified through the second verification process. In the current operation, another service server 11-2 may be determined based on the used service list 32 of the client 13. This will be described in more detail later with reference to FIG. 6.

In operation S35, a fourth search and verification process (hereinafter, referred to as a 'fourth verification process') may be performed. The fourth verification process is a process of retrieving and verifying token verification information through the authentication server 12 (or a process of requesting the authentication server 12 to verify the token 31). The fourth verification process may be performed when verification of the token 31 through the third verification process fails.

Until now, the token verification method according to the embodiments of the present disclosure has been roughly described with reference to FIG. 3. Hereinafter, each verification process will be described in more detail with reference to FIG. 4 and subsequent drawings.

Figure 4:
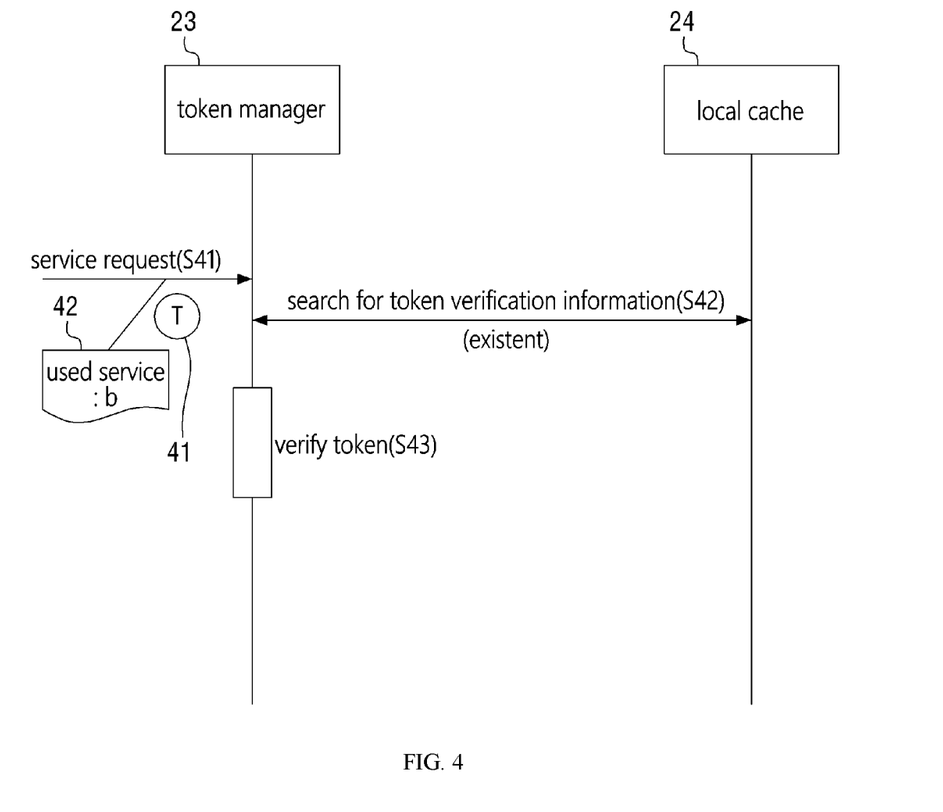
FIG. 4 is an example detailed flowchart illustrating a first search and verification process according to embodiments of the present disclosure.

FIG. 4 is an example detailed flowchart illustrating the first verification process according to embodiments of the present disclosure. In FIG. 4, it is assumed that verification information of a token 41 exists in the local cache 24.

As illustrated in FIG. 4, the first verification process may start with operations S41 and S42 in which the token manager 23 searches the local cache 24 in response to a service request from the client. For example, the token manager 23 may search the local cache 24 using the token 41 (e.g., a key included in the token).

In operation S43, the token manager 23 may verify the validity of the token 41 using found verification information. For example, the token manager 23 may verify the validity of the token 41 based on an expiration date included in the verification information (e.g., determine that the token 41 is valid if the expiration date has not passed).

In some embodiments, when determining (verifying) that the token 41 is valid, the token manager 23 may update (extend) the expiration date of the verification information stored in the local cache 24. In so doing, unnecessary repetition of login of the client 13 can be prevented, and user convenience can be improved. In some cases, the token manager 23 may also update (extend) the expiration date of the verification information stored in the database 22 and send the updated token verification information to another service server (e.g., 11-2) or the authentication server 12. Here, another service server (e.g., 11-2) may be, for example, a service server related to a used service list 42 (e.g., a server related to a recently used service, a server related to a service randomly selected from the list, a server related to all services in the list, etc.), a server randomly selected from among all service servers, a service server frequently used by a plurality of clients 13 (e.g., a server related to a service whose frequency of use is equal to or higher than a reference value, a server related to the most frequently used service after current service A is used, etc.). However, the scope of the present disclosure is not limited by these examples.

Until now, the first verification process according to the embodiments of the present disclosure has been described with reference to FIG. 4. According to the above description, when the verification information of the token 41 exists in the local cache 24, the validity of the token 41 can be verified through the local storage of a service server 11 instead of through the authentication server 12. Accordingly, the verification of the token 41 can be performed at high speed, and the response speed for a requested service can be greatly improved. Furthermore, a single point of failure (SPOF) problem and a load problem of the authentication server 12 can be greatly alleviated. For example, even if a failure occurs in the authentication server 12, there is a possibility that the token 41 will be verified. Therefore, the problem that service provision is stopped due to the failure of the authentication server 12 (or centralized token storage) can be greatly alleviated.

The second verification process according to embodiments of the present disclosure will now be described with reference to FIG. 5. For clarity of the present disclosure, any description overlapping that of the previous embodiments will be omitted.

Figure 5:
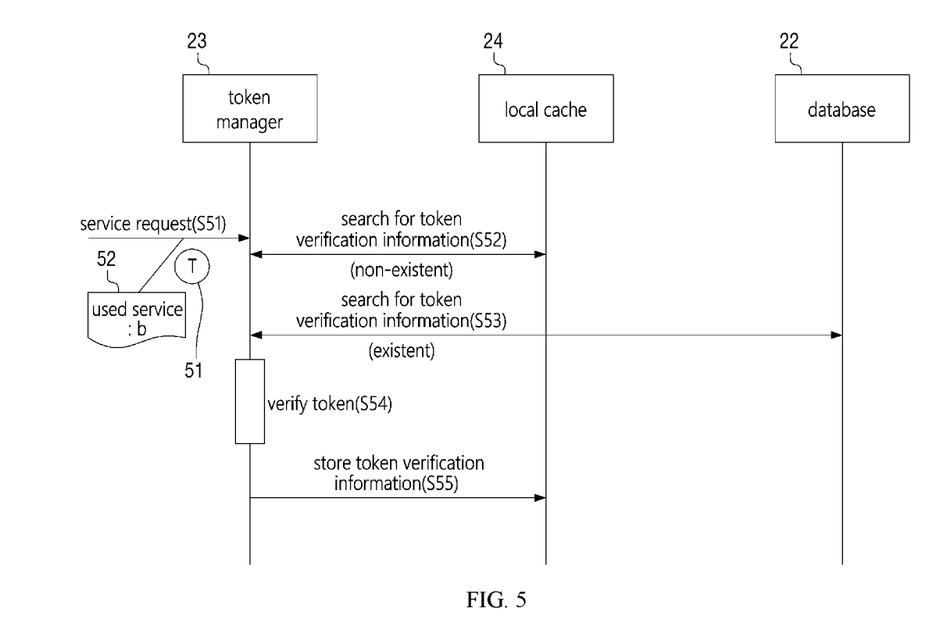
FIG. 5 is an example detailed flowchart illustrating a second search and verification process according to embodiments of the present disclosure.

FIG. 5 is an example detailed flowchart illustrating the second verification process according to embodiments of the present disclosure. In FIG. 5, it is assumed that verification information of a token 51 does not exist in the local cache 24 but exists in the database 22.

As illustrated in FIG. 5, the second verification process may be performed when verification of the token 51 through the first verification process fails (e.g., when the token verification information does not exist in the local cache 24 or when the expiration date of the token 51 has passed according to the token verification information in the local cache 24) (see operations S51 and S52).

In operation S53, the token manager 23 may search for the verification information of the token 51 through the database 22. For example, the token manager 23 may search the database 22 in response to a search result indicating that the verification information of the token 51 does not exist in the local cache 24. As described above, the database 22 may be a local storage space of a service server 11 and a storage space shared between a plurality of instances 21. Therefore, if another instance (e.g., 21-2) stored the verification information of the token 51 in the database 22 (e.g., a case where the client 13 used a currently requested service through the instance 21-2), the token manager 23 of a current instance (e.g., 21-1) can obtain the verification information of the token 51.

In some embodiments, the token manager 23 may search the database 22 in response to the determination that the currently requested service exists in a used service list 52. This is because if the currently requested service does not exist in the used service list 52, it is very unlikely that the verification information of the token 51 is stored in the database 22. However, FIG. 5 illustrates a case where the verification information of the token 51 exists in the database 22.

In operation S54, the token manager 23 may verify the token 51 using the found verification information.

In operation S55, the token manager 23 may store the verification information found in the database 22 in the local cache 24. Therefore, when a service request is received again from the same client 13, token verification can be performed quickly. Furthermore, the effect of storing the verification information of the token 51 in a distributed manner at the instance level can be achieved.

In some embodiments, when determining (verifying) that the token 51 is valid, the token manager 23 may update (extend) the expiration date of the verification information stored in the database 22 and/or the local cache 24 (accordingly, the expiration date in the verification information stored in each service server may change). In so doing, unnecessary repetition of login of the client 13 can be prevented, and user convenience can be improved. The current embodiments may be further understood from the description of the previous embodiments.

Until now, the second verification process according to the embodiments of the present disclosure has been described with reference to FIG. 5. According to the above description, when the verification information of the token 51 exists in the database 22, the validity of the token 51 can be verified through the local storage of the service server 11 instead of through the authentication server 12. Accordingly, the verification of the token 51 can be performed at high speed, and the response speed for a requested service can be greatly improved. Furthermore, the SPOF problem and the load problem of the authentication server 12 can be alleviated. For example, even if a failure occurs in the authentication server 12, there is a possibility that the token 51 will be verified. Therefore, the problem that service provision is stopped due to the failure of the authentication server 12 can be greatly alleviated.

The third verification process according to embodiments of the present disclosure will now be described with reference to FIG. 6. For clarity of the present disclosure, any description overlapping that of the previous embodiments will be omitted.

Figure 6:
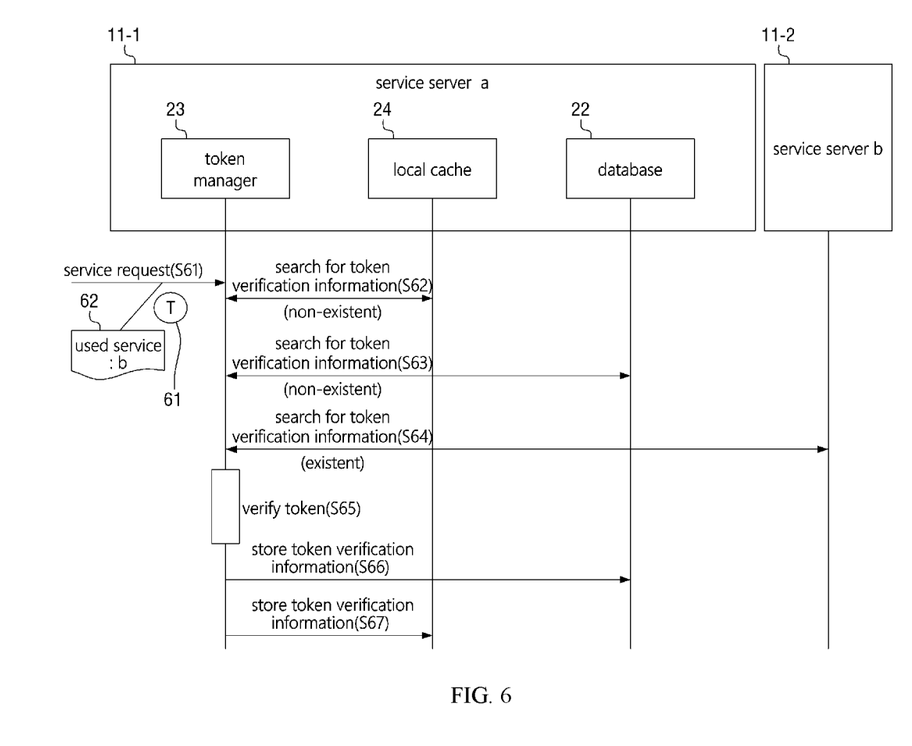
FIG. 6 is an example detailed flowchart illustrating a third search and verification process according to embodiments of the present disclosure.

FIG. 6 is an example detailed flowchart illustrating the third verification process according to embodiments of the present disclosure. In FIG. 6, it is assumed that token verification information does not exist in a service server 11-1 receiving a service request message but exists in another service server 11-2.

As illustrated in FIG. 6, the third verification process may be performed when verification of a token 61 through the second verification process fails (e.g., when token verification information does not exist in the database 22 or when the expiration date of the token 61 has passed according to the token verification information in the database 22) (see operations S61 through S63).

In operation S64, the token manager 23 may search for the verification information of the token 61 through another service server 11-2. For example, the token manager 23 may search another service server 11-2 in response to a search result indicating that the verification information of the token 61 does not exist in the database 22. For example, the token manager 23 may request another service server 11-2 to search for the verification information of the token 61 (i.e., may send a request message) and receive the search result from the service server 11-2. A method of designating a service server (e.g., 11-2) to be searched may vary depending on embodiments.

In some embodiments, servers related to all services included in a used service list 62 may be designated as servers to be searched, that is, search targets.

In some embodiments, a server (e.g., 11-2) related to a service randomly selected from among all services included in the used service list 62 may be designated as a search target.

In some embodiments, a server (e.g., 11-2) related to the most recently used service among all services included in the used service list 62 may be designated as a search target. This is because an expiration date in token verification information stored in the service server (e.g., 11-2) will be the longest. In the current embodiments, the token manager 23 may make a search request only to the server (e.g., 11-2) related to the most recently used service or may also make the search request to servers (e.g., 11-3) related to other services included in the used service list 62.

In some embodiments, a search target may be sequentially designated in the order of recent use of the services included in the used service list 62. That is, the token manager 23 may sequentially search each search target in the order of recent use of the services included in the used service list 62.

In some embodiments, a search target may be designated regardless of the used service list 62. For example, the token manager 23 may designate a server randomly selected from among all service servers as a search target. For another example, the token manager 23 may designate a service server frequently used by a plurality of clients 13 as a search target (e.g., a server related to a service whose frequency of use is equal to or higher than a reference value, a server related to the most frequently used service after current service A is used, etc.). For another example, the token manager 23 may designate service servers whose loads are equal to or less than a reference value as search targets.

In some embodiments, the number of service servers (e.g., 11-2) to be searched may vary based on the load of the service server 11-1. For example, if the load of the service server 11-1 is equal to or greater than a threshold value, the token manager 23 may reject a service request from the client 13 or reduce the number of servers to be searched without performing the third search process. In the opposite case, the token manager 23 may increase the number of servers to be searched.

In some embodiments, a service server (e.g., 11-2) to be searched may be designated based on various combinations of the above-described embodiments.

In operation S64, in some cases, the token manager 23 may request another service server 11-2 to verify the token 61 and may receive the verification result from the service server 11-2. At this time, the token manager 23 may also receive verification information of the token 61.

Figure 7:
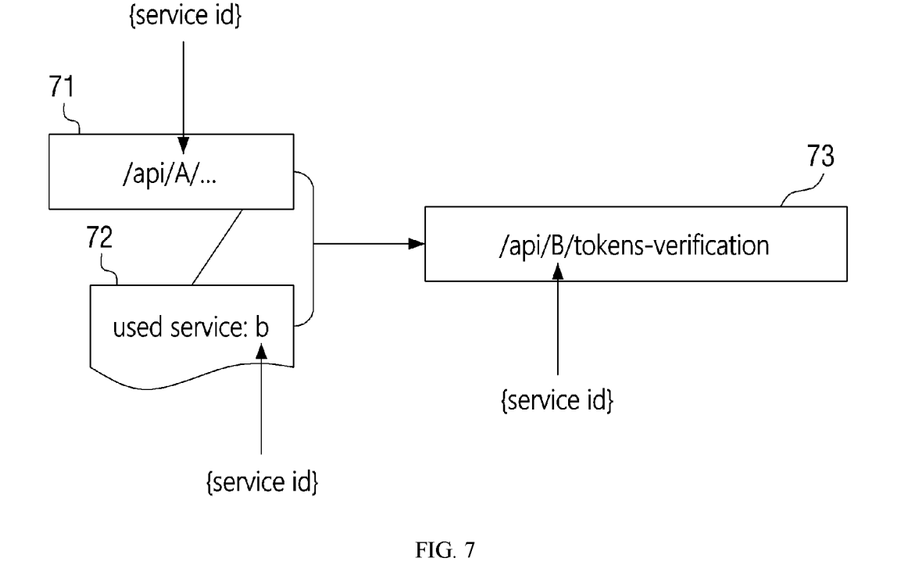
FIG. 7 is an example diagram illustrating a method of generating a uniform resource locator (URL) for a token verification request (or a token verification information search request) according to embodiments of the present disclosure.

In some embodiments, the token manager 23 may make a search (or verification) request to another service server 11-2 by calling an API. In addition, the token manager 23 may generate a URL for calling the API by using a service ID included in the used service list 62. For example, as illustrated in FIG. 7, assume that a service request to a certain service server (e.g., 11-1) is made by calling an API using a certain URL 71. In addition, assume that the URL 71 includes an ID (e.g., 'A') of a requested service. In this case, the token manager 23 may generate a URL 73 for making a search request to a related service server (e.g., 11-2) by using a service ID (13') in a used service list 72. Then, the token manager 23 may call an API using the generated URL 73 to request retrieval of token verification information or verification of a token.

Referring back to FIG. 6, in operation S65, the token manager 23 may verify the token 61 using the found verification information. If the token manager 23 receives the result of verifying the token 61 from another service server 11-2, this operation may be omitted.

In operations S66 and S67, the token manager 23 may store the found verification information in the local cache 24 and the database 22. Therefore, when a service request is received again from the same client 13, token verification can be performed quickly. Furthermore, the effect of storing the verification information of the token 61 in a distributed manner at the service server level can be achieved.

For reference, although a case where operations S66 and S67 are sequentially performed is illustrated in FIG. 6 as an example, the order of performing the two operations can be changed.

In some embodiments, when determining (verifying) that the token 61 is valid, the token manager 23 may update (extend) the expiration date of the verification information stored in another service server 11-2, the database 22 and/or the local cache 24. In so doing, unnecessary repetition of login of the client 13 can be prevented, and user convenience can be improved. The current embodiments may be further understood from the description of the previous embodiments.

Until now, the third verification process according to the embodiments of the present disclosure has been described with reference to FIGS. 6 and 7. According to the above description, when the verification information of the token 61 exists in another service server 11-2, the validity of the token 61 can be verified without through the authentication server 12. In addition, since the verification information obtained from another service server 11-2 is stored in the local storage spaces 22 and 24 of the service server 11-1, the verification information of the token 61 can be naturally stored in a distributed manner. Accordingly, the SPOF problem and the load problem of the authentication server 12 can be further alleviated. For example, even if a failure occurs in the authentication server 12, the possibility that the token 61 will be verified is greatly improved. Therefore, the problem that service provision is stopped due to the failure of the authentication server 12 can be greatly alleviated.

The fourth verification process according to embodiments of the present disclosure will now be described with reference to FIG. 8. For clarity of the present disclosure, any description overlapping that of the previous embodiments will be omitted.

Figure 8:
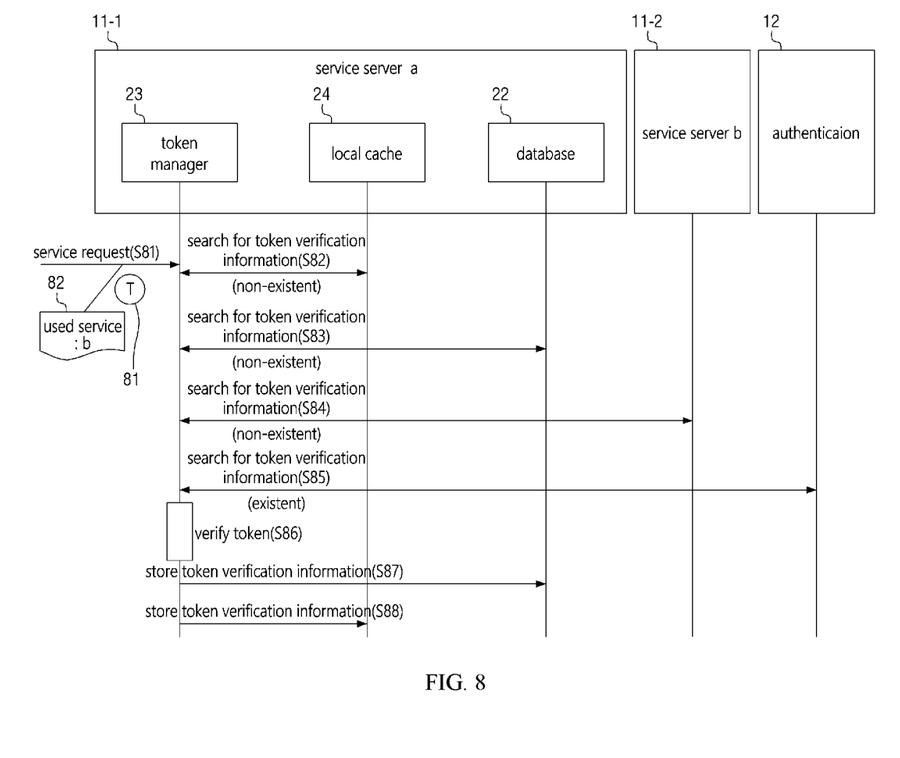
FIG. 8 is an example detailed flowchart illustrating a fourth search and verification process according to embodiments of the present disclosure.

FIG. 8 is an example detailed flowchart illustrating the fourth verification process according to embodiments of the present disclosure. In FIG. 8, it is assumed that verification information of a token 81 does not exist in a service server 11-1 receiving a service request message and another service server 11-2.

As illustrated in FIG. 8, the fourth verification process may be performed when verification of the token 81 through the third verification process fails (e.g., when token verification information does not exist in another service server 11-2 or when the expiration date of the token 81 has passed according to the token verification information in another service server 11-2) (see operations S81 through S84).

In operation S85, the token manager 23 may search for the verification information of the token 81 through the authentication server 12. For example, in response to a search result indicating that the verification information of the token 81 does not exist in another service server 11-2, the token manager 23 may request the authentication server 12 to search for the verification information of the token 81 (i.e., send a request message) and may receive the search result from the authentication server 12. Alternatively, the service server 11-1 may request the authentication server 12 to verify the token 81 and receive the verification result. At this time, the service server 11-1 may receive the verification information of the token 81 together with the verification result.

In operation S86, the token manager 23 may verify the token 81 using the found verification information. If the token manager 23 receives the result of verifying the token 81 from the authentication server 12, this operation may be omitted.

In operations S87 and S88, the token manager 23 may store the verification information of the token 81 obtained from the authentication server 12 in the local cache 24 and the database 22. Therefore, when a service request is received again from the same client 13, token verification can be performed quickly. Furthermore, the effect of storing the verification information of the token 81 in a distributed manner at the service server level can be achieved. In some cases, the token manager 23 may also store the verification information in a local cache of another instance.

For reference, although a case where operations S87 and S88 are sequentially performed is illustrated in FIG. 8 as an example, the order of performing the two operations can be changed.

In some embodiments, when determining (verifying) that the token 81 is valid, the token manager 23 may update (extend) the expiration date of the verification information stored in another service server 11-2, the database 22 and/or the local cache 24. In so doing, unnecessary repetition of login of the client 13 can be prevented, and user convenience can be improved. The current embodiments may be further understood from the description of the previous embodiments.

In addition, in some embodiments, the token manager 23 may propagate (spread) the verification information of the token 81 obtained from the authentication server 12 to another service server (e.g., 11-2). Here, another service server (e.g., 11-2) may be, for example, a service server related to a used service list 82, a randomly selected service server, a service server frequently used by a plurality of clients 13 (e.g., a server related to a service whose frequency of use is equal to or higher than a reference value, a server related to the most frequently used service after current service A is used, etc.), or a service server whose load is equal to or less than a reference value, but the scope of the present disclosure is not limited thereto. According to the current embodiments, since the verification information of the token 81 is quickly spread (distributed), the SPOF problem and the load problem of the authentication server 12 can be alleviated more quickly.

Until now, the fourth verification process according to the embodiments of the present disclosure has been described with reference to FIG. 8. According to the above description, since the verification information of the token 81 obtained from the authentication server 12 is stored in the local storage spaces 22 and 24 of the service server 11-1, the verification information of the token 81 can be naturally stored in a distributed manner. Accordingly, the SPOF problem and the load problem of the authentication server 12 can be further alleviated. For example, even if a failure occurs in the authentication server 12, the possibility that the token 81 will be verified is improved. Therefore, the problem that service provision is stopped due to the failure of the authentication server 12 can be greatly alleviated.

Until now, the verification processes included in the token verification method according to the embodiments of the present disclosure have been described with reference to FIGS. 4 through 8. Hereinafter, a method of updating a used service list according to embodiments of the present disclosure will be described with reference to FIG. 9.

Figure 9:
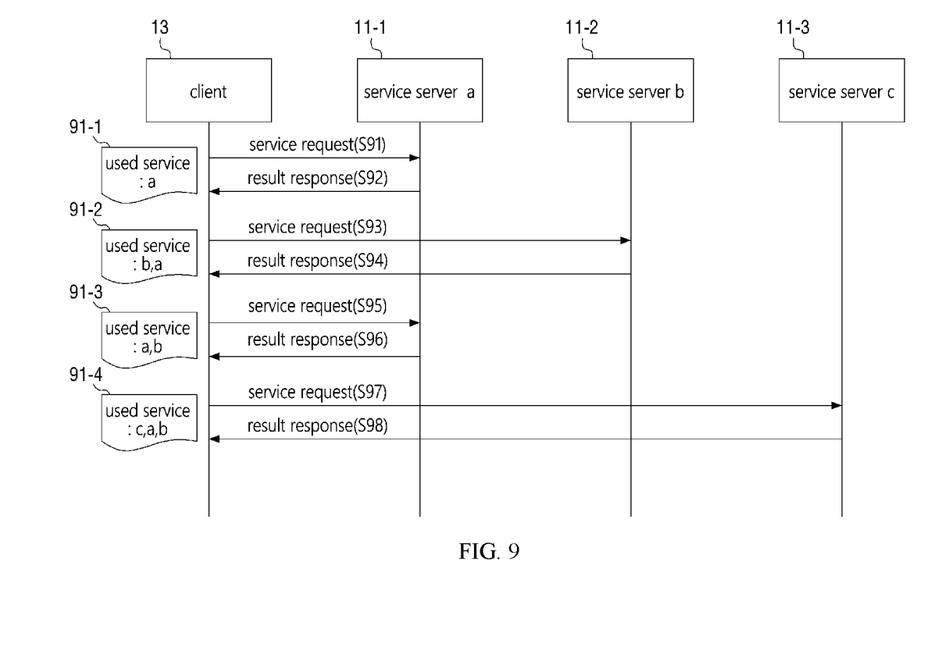
FIG. 9 is an example diagram illustrating a method of updating a used service list according to embodiments of the present disclosure.

FIG. 9 is an example diagram illustrating a method of updating a used service list according to embodiments of the present disclosure.

As illustrated in FIG. 9, the client 13 may update a used service list 91-1 through 91-4 by adding service IDs included in response messages of the service servers 11-1 through 11-3 or changing the arrangement order of the service IDs.

For example, assume that the client 13 sends a service request message to the server 11-1 related to 'service A' and receives a response message to the request from the service server 11-1 (operations S91 and S92). In this case, the client 13 may add service ID 'A' included in the response message to the used service list (see 91-1 for the update result).

Next, assume that the client 13 sends a service request message to the server 11-2 related to 'service B' and receives a response message to the request from the service server 11-2 (operations S93 and S94). In this case, the client 13 may add service ID 'B' included in the response message to the used service list 91-1 (see 91-2 for the update result). Here, the client 13 may perform an update by adding the recently used service ID B' in front of (or above) the other service ID 'A'.

Next, assume that the client 13 sends a service request message to the server 11-1 related to 'service A' and receives a response message to the request from the service server 11-1 (operations S95 and S96). In this case, the client 13 may change the arrangement order of service IDs so that the service ID 'A' included in the response message is located at the front (or top) (see 91-3 for the update result).

Next, assume that the client 13 sends a service request message to the server 11-3 related to 'service C' and receives a response message to the request from the service server 11-3 (operations S97 and S98). In this case, the client 13 may add service ID 'C' included in the response message to the used service list 91-3 (see 91-4 for the update result). Here, the client 13 may perform an update by adding the recently used service ID 'C' in front of (or above) the other service IDs 'A' and 13'.

In some embodiments, a size limit (i.e., a limit on the number of services) may be set in the used service list (e.g., 91-4). This is because since an expiration date is set for a token, it is very unlikely that there is valid token verification information in a server (e.g., 11-2) related to a service that was used a long time ago. In the current embodiments, when the size of the used service list (e.g., 91-4) exceeds a threshold value, the client 13 may delete the oldest service ID (e.g., 'B') in the service list (e.g., 91-4). For example, assume that a maximum size of the used service list (e.g., 91-4) is set to '2'. In this case, the client 13 may add the service ID 'C' while deleting the service ID 'B' from the used service list 91-4 (see operations S97 and S98).

Until now, the method of updating the used service list according to the embodiments of the present disclosure has been described with reference to FIG. 9. Hereinafter, an example computing device 100 that can implement the service server 11, the instance 21, the token manager 23, and/or the service providing system 10 according to the embodiments of the present disclosure will be described with reference to FIG. 10.

FIG. 10 illustrates an example hardware configuration of a computing device 100.

Referring to FIG. 10, the computing device 100 may include one or more processors 101, a bus 103, a communication interface 104, a memory 102 which loads a computer program to be executed by the processors 101, and a storage 105 which stores a computer program 106. In FIG. 10, only the components related to the embodiments of the present disclosure are illustrated. Therefore, it will be understood by those of ordinary skill in the art to which the present disclosure pertains that other general-purpose components can be included in addition to the components illustrated in FIG. 10. That is, the computing device 100 may further include various components other than the components illustrated in FIG. 10. In addition, in some cases, some of the components illustrated in FIG. 10 may be omitted from the computing device 100. Each component of the computing device 100 will now be described.

The processors 101 may control the overall operation of each component of the computing device 100. The processors 101 may include at least one of a central processing unit (CPU), a micro-processor unit (MPU), a micro-controller unit (MCU), a graphic processing unit (GPU), and any form of processor well known in the art to which the present disclosure pertains. In addition, the processors 101 may perform an operation on at least one application or program for executing operations/methods according to embodiments of the present disclosure. The computing device 100 may include one or more processors.

Next, the memory 102 may store various data, commands and/or information. The memory 102 may load the computer program 106 from the storage 105 to execute operations/methods according to embodiments of the present disclosure. The memory 102 may be implemented as a volatile memory such as a random access memory (RAM), but the technical scope of the present disclosure is not limited thereto.

Next, the bus 103 may provide a communication function between the components of the computing device 100. The bus 103 may be implemented as various forms of buses such as an address bus, a data bus, and a control bus.

Next, the communication interface 104 may support wired and wireless Internet communication of the computing device 100. In addition, the communication interface 104 may support various communication methods other than Internet communication. To this end, the communication interface 104 may include a communication module well known in the art to which the present disclosure pertains.

Next, the storage 105 may non-temporarily store one or more programs 106. The storage 105 may include a non-volatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

Next, the computer program 106 may include one or more instructions for controlling the processors 101 to perform operations/methods according to various embodiments of the present disclosure when the computer program 106 is loaded into the memory 102. That is, the processors 101 may perform the operations/methods according to the various embodiments of the present disclosure by executing the loaded instructions.

For example, the computer program 106 may include instructions for performing an operation of receiving a service request message including a token from a client, an operation of performing a first verification process for the token through local storage of a service server in response to the service request message, and an operation of performing a second verification process for the token through another service server related to a used service list in response to failure of the first verification process. In this case, the token manager 23, the instance 21, and/or the service server 11 according to the embodiments of the present disclosure may be implemented through the computing device 100.

In some embodiments, the computing device 100 illustrated in FIG. 10 may be a virtual machine implemented based on cloud technology. For example, the computing device 100 may be a virtual machine operating on one or more physical servers included in a server farm. In this case, at least some of the processors 101, the memory 102, and the storage 105 illustrated in FIG. 10 may be virtual hardware, and the communication interface 104 may also be a virtualized networking element such as a virtual switch.

Until now, an example computing device 100 that can implement the service server 11, the instance 21, the token manager 23 and/or the service providing system 10 according to the embodiments of the present disclosure has been described with reference to FIG. 10.

According to embodiments of the present disclosure, when token verification information exists in local storage (e.g., local cache, database) of a service server, the validity of a token issued to a client can be verified using the information. Accordingly, token verification speed and service response speed can be greatly improved. In addition, since the frequency of token verification through an authentication server is greatly reduced, the SPOF problem and the load problem of the authentication server can be greatly alleviated. For example, even if a failure occurs in the authentication server, there is a possibility that the token will be verified. Therefore, the problem that service provision of a system is stopped due to the failure of the authentication server can be alleviated (that is, system stability is improved). In addition, since centralized token storage is not used, the problem of the centralized token storage being an SPOF can be easily resolved.

In addition, the validity of the token issued to the client can be verified through another service server. Accordingly, the SPOF problem and the load problem of the authentication server can be further alleviated.

In addition, since the verification information obtained from another service server or the authentication server is stored in the local storage (e.g., local cache, database) of the service server, the token verification information can be naturally stored in a distributed manner. Accordingly, the SPOF problem and the load problem of the authentication server can be further alleviated. For example, even if a failure occurs in the authentication server, token verification can be performed through the local storage of the service server or another service server. Therefore, the problem that service provision of the system is stopped can be greatly alleviated.

In addition, since the token verification information is distributed and stored in a plurality of service servers, the load on the authentication server is greatly reduced. Therefore, even if the size of the service providing system increases (e.g., the number of service servers increases), an increase in the load imposed on the authentication server may be insignificant.

However, the effects of the present disclosure are not restricted to the one set forth herein. The above and other effects of the present disclosure will become more apparent to one of daily skill in the art to which the present disclosure pertains by referencing the claims.

What is claimed is:

1. A token verification method performed by a service server, the method comprising:
    receiving a service request message comprising a token from a client;
    performing a first verification process for the token through local storage of the service server in response to the service request message; and
    performing a second verification process for the token through another service server, selected among service servers that provided services, in response to failure of the first verification process,
    wherein the services are sequentially used by the client prior to reception of the service request message, and
    wherein the service request message further comprises a used service list of the client, the used service list including the services.

2. The method of claim 1, wherein the local storage comprises a local cache and a database, and the performing of the first verification process comprises:

searching the local cache for verification information of the token; and searching the database for the verification information in response to a search result indicating that the verification information does not exist in the local cache.

3. The method of claim 2, wherein the service server provides a service using a plurality of instances, the local cache exists in each of the plurality of instances, and the database is shared between the plurality of instances.

4. The method of claim 3, wherein a token manager is executed in each of the plurality of instances, and the token verification method is performed by the token manager.

5. The method of claim 2, wherein the searching of the database for the verification information comprises searching the database in response to a determination that a service provided by the service server exists in the used service list.

6. The method of claim 2, further comprising:
verifying the token using the verification information in response to a search result indicating that the verification information exists in the database; and
storing the verification information in the local cache.

7. The method of claim 1, further comprising:
obtaining verification information of the token from the another service server through the second verification process; and
storing the verification information in the local storage.

8. The method of claim 1, wherein the another service server provides a most recently used service in the used service list.

9. The method of claim 1, wherein the another service server comprises a first service server providing a most recently used service in the used service list and a second service server providing another service, and the performing of the second verification process comprises verifying the token only through the first service server.

10. The method of claim 1, further comprising performing a third verification process for the token through an authentication server in response to failure of the second verification process, wherein the authentication server is a server that has issued the token.

11. The method of claim 10, further comprising:
obtaining verification information of the token from the authentication server through the third verification process; and
storing the verification information in the local storage.

12. The method of claim 10, further comprising:
obtaining the verification information of the token from the authentication server through the third verification process; and
storing the verification information in the another service server.

13. The method of claim 1, wherein a uniform resource locator (URL) of the service server comprises an ID of a service provided by the service server, the used service list is comprised of IDs of used services, and the performing of the second verification process comprises:
generating a URL for requesting verification of the token or verification information of the token by using an ID of a used service, among the IDs of used services included in the used service list: and
performing the second verification process through the another service server by using the generated URL.

14. A service server comprising:
a communication interface communicating with a client;
local storage;
at least one processor; and
a memory configured to store instructions,
wherein the at least one processor is configured to, by executing the instructions stored in the memory, perform:
receiving a service request message comprising a token from the client;
performing a first verification process for the token through the local storage in response to the service request message; and
performing a second verification process for the token through another service server, selected among service servers that provided services, in response to failure of the first verification process,
wherein the services are sequentially used by the client prior to reception of the service request message, and
wherein the service request message further comprises a used service list of the client, the used service list including the services.

15. The service server of claim 14, wherein the local storage comprises a local cache and a database, and the performing the first verification process comprises:
searching the local cache for verification information of the token; and
searching the database for the verification information in response to a search result indicating that the verification information does not exist in the local cache.

16. The service server of claim 15, wherein the searching the database for the verification information comprises searching the database in response to a determination that a service provided by the service server exists in the used service list.

17. The service server of claim 15, further comprising:
verifying the token using the verification information in response to a search result indicating that the verification information exists in the database; and
storing the verification information in the local cache.

18. The service server of claim 14, further comprising performing a third verification process for the token through an authentication server in response to failure of the second verification process, wherein the authentication server is a server that has issued the token.

19. The service server of claim 18, further comprising:
obtaining verification information of the token from the authentication server through the third verification process; and
storing the verification information in the local storage.

20. A non-transitory computer-readable medium storing computer program executable by a computing device, which implements a service server to execute:
receiving a service request message comprising a token from a client;
performing a first verification process for the token through local storage of the service server in response to the service request message; and
performing a second verification process for the token through another service server, selected among service servers that provided services, in response to failure of the first verification process,
wherein the services are sequentially used by the client prior to reception of the service request message, and
wherein the service request message further comprises a used service list of the client, the used service list including the services.

* * * * *